(12) United States Patent
Pereira et al.

(10) Patent No.: US 12,550,244 B2
(45) Date of Patent: Feb. 10, 2026

(54) SYSTEM COMPRISING A LUMINAIRE AND A CAMERA MODULE

(71) Applicant: Tridonic GmbH & Co KG, Dornbirn (AT)

(72) Inventors: Eduardo Pereira, Siebnen (CH); Waldemar Becker, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 126 days.

(21) Appl. No.: 18/549,384

(22) PCT Filed: Mar. 3, 2022

(86) PCT No.: PCT/EP2022/055482
§ 371 (c)(1),
(2) Date: Sep. 7, 2023

(87) PCT Pub. No.: WO2022/189269
PCT Pub. Date: Sep. 15, 2022

(65) Prior Publication Data
US 2024/0306279 A1    Sep. 12, 2024

(30) Foreign Application Priority Data
Mar. 11, 2021  (EP) .................................... 21161927

(51) Int. Cl.
*H05B 47/125*   (2020.01)
*F21S 8/08*   (2006.01)
(Continued)

(52) U.S. Cl.
CPC ............ *H05B 47/125* (2020.01); *F21S 8/086* (2013.01); *F21V 23/003* (2013.01); *H04N 23/57* (2023.01);
(Continued)

(58) Field of Classification Search
CPC .... H05B 47/125; H05B 47/19; H05B 47/183; H04N 23/57
See application file for complete search history.

(56) References Cited

U.S. PATENT DOCUMENTS 10,165,650 B1 * 12/2018 Fini ........................ H05B 45/10
11,019,708 B1 *  5/2021 Leizerovich ........... H05B 47/16
(Continued)

FOREIGN PATENT DOCUMENTS

WO    2015152388 A1    10/2015

OTHER PUBLICATIONS

PCT/EP2022/055482, International Search Report and Written Opinion dated Jun. 10, 2022, 6 pages.

*Primary Examiner* — Zhubing Ren
(74) *Attorney, Agent, or Firm* — Andrus Intellectual Property Law, LLP

(57) ABSTRACT

The present invention provides a system comprising a luminaire and a camera module. The luminaire and the camera module each comprise an interface for mechanically and electrically connecting the camera module and the luminaire with each other. The luminaire is configured to electrically supply the camera module with electrical energy via the interface of the luminaire and the interface of the camera module, when the interface of the camera module is electrically and mechanically connected to the interface of the luminaire. The camera module comprises a control circuit and at least one image sensor. The image sensor is configured to detect an image of an area within the detection field of the camera module and provide the image in the form of image data to the control circuit. The control circuit is configured to determine information on the area by extracting the information from the image data.

18 Claims, 7 Drawing Sheets

(51) Int. Cl.
*F21V 23/00* (2015.01)
*H04N 23/57* (2023.01)
*H04N 23/661* (2023.01)
*H05B 47/18* (2020.01)
*H05B 47/19* (2020.01)
*F21W 131/103* (2006.01)

(52) U.S. Cl.
CPC ......... *H04N 23/661* (2023.01); *H05B 47/183* (2024.01); *H05B 47/19* (2020.01); *F21W 2131/103* (2013.01)

(56) References Cited

U.S. PATENT DOCUMENTS

| | | | | |
|---|---|---|---|---|
| 2012/0020060 | A1* | 1/2012 | Myer | F21S 9/043 |
| | | | | 362/183 |
| 2012/0057050 | A1* | 3/2012 | Ashdown | H04N 1/60 |
| | | | | 348/E9.053 |
| 2016/0323970 | A1* | 11/2016 | Weber | G06F 18/2321 |
| 2017/0206785 | A1* | 7/2017 | Kim | G06V 20/52 |

\* cited by examiner

SYSTEM COMPRISING A LUMINAIRE AND A CAMERA MODULE

CROSS REFERENCE TO RELATED APPLICATIONS

The present application is the U.S. national stage application of international application PCT/EP2022/055482 filed Mar. 3, 2022, which international application was published on Sep. 15, 2022 as International Publication WO 2022/189269 A1. The international application claims priority to European Patent Application No. 21161927.5 filed Mar. 11, 2021.

TECHNICAL FIELD OF THE INVENTION

The present invention relates to a system comprising a luminaire and a camera module. The luminaire is optionally an outdoor luminaire, such as a street luminaire.

BACKGROUND OF THE INVENTION

In the prior art, luminaires for illuminating an area, such as an outdoor luminaire illuminating an outdoor area are well known. An example of an outdoor luminaire is a street luminaire that is used for illuminating a street area, such as a street, parking lot, sidewalk for pedestrian, cycle lane etc. The terms "illuminate" and "light" are used as synonyms and, thus, the passages "luminaire for illuminating an area" and "luminaire for lighting an area" are synonyms.

It is preferred that an illumination of an area by the luminaire may be controlled in dependence on the state of the area. For this, it is necessary to provide the luminaire with information on the area. This may be done by providing a communication link between the luminaire and an external element, such as a control circuit or sensor unit. Such a communication link may be either wired or wireless. In case of a wired communication there needs to be an effort in wiring the luminaire with the respective external element. This may increase the complexity and costs of installing such a system comprising a luminaire and one or more external elements. A wireless communication may have the disadvantage of high data rates and high bandwidth needed for providing data from such external elements to the luminaire.

Therefore, it is an object of the present invention to provide a system comprising a luminaire that allows to improve the function of the luminaire beyond a mere illumination function, while decreasing or overcoming the above mentioned disadvantages and drawbacks. In particular, it is an object of the present invention to provide a system comprising a luminaire that allows to flexibly adjust the function of the luminaire.

These and other objects, which become apparent upon reading the following description, are solved by the subject-matter of the independent claim. The dependent claims refer to preferred embodiments of the invention.

SUMMARY OF THE INVENTION

According to a first aspect of the present invention a system is provided. The system comprises a luminaire and a camera module. The luminaire is optionally an outdoor luminaire. The luminaire and the camera module each comprise an interface for mechanically and electrically connecting the camera module and the luminaire with each other. The camera module is configured to be mechanically and electrically connected to the luminaire by mechanically and electrically connecting the interface of the camera module to the interface of the luminaire. The luminaire is configured to electrically supply the camera module with electrical energy via the interface of the luminaire and the interface of the camera module, when the interface of the camera module is electrically and mechanically connected to the interface of the luminaire. The camera module comprises a control circuit and at least one image sensor. The at least one image sensor is configured to detect an image of an area within the detection field of the camera module and provide the image in the form of image data to the control circuit. The control circuit is configured to determine information on the area by extracting the information from the image data.

In other words, the present invention proposes a system comprising a luminaire and a camera module, wherein the luminaire and the camera module each comprise a mechanical and electrical interface, via which the camera module may be mechanically and electrically connected to the luminaire. That is, the camera module may be integrated with the luminary by connecting the interface of the camera module with the interface of the luminaire. This has the advantage that the interfaces allow to flexibly connect (mechanically and electrically) the luminaire and the camera module with each other and, thus, to improve the luminaire by adding the function of the camera module to the function of the luminaire.

The control circuit of the camera module is configured to process the image data of the at least one image sensor of the camera module in order to determine information on the area (within the detection filed of the camera module). That is, already at the camera module the raw data (i.e. image data) of the camera module (detected by the at least one image sensor) are locally processed for determining information on the area.

As a result, in case of a wireless communication between the camera module and the luminaire, the data rate and bandwidth needed for such a wireless communication may be reduced because the camera module may be configured to communicate the determined information on the area instead of a mere communication of raw data (i.e. image data) of the at least one image sensor. A wireless communication of raw data may get complex and increase data rate and required bandwidths in case of increasing amounts of raw data. In case of a wired communication between the camera module and the luminaire, no complex wiring is required, because the camera module is configured to be integrated in the luminaire by electrically and mechanically connecting the interface of the camera module to the interface of the luminaire. Further, communicating only the determined information instead of the image data has the advantage of maintaining privacy. Namely, the image data correspond to images of the area, which are not communicated when communicating the determined information.

The information on the area that may be determined by the control circuit of the camera module may be communicated to the luminaire based on wired or wireless communication, as described above, and thus may be used by the luminaire. This allows the luminaire to illuminate the area dependent on the state of the area.

In particular, the interface of the luminaire comprises or corresponds to a mechanical and electrical supply interface. In particular, the interface of the camera module comprises or corresponds to a mechanical and electrical supply interface matching the mechanical and electrical supply interface of the luminaire. The interface of the luminaire and the interface of the camera module may be referred to as mechanical and electrical interface.

The interface of the luminaire and the interface of the camera module may be configured to be detachably connected to each other. That is once they are connected to each other, they may also be disconnected again. In particular, the interface of the camera module and the interface of the luminaire match to each other.

The interface of the camera module and the interface of the luminaire may be configured for a snap-in connection, clip-in connection, and/or plug-in connection with each other. The interface of the luminaire may comprise one or more snap-in connectors, one or more clip-in connectors and/or one or more plug-in connectors, wherein the interface of the camera module may comprise one or more matching connectors. The same may be true vice versa. The interface of the camera module and the interface of the luminaire may be configured for a positive-locking and/or friction connection. The interface of the camera module and the interface module may be configured for any mechanical connection known in the art, allowing the interface of the camera module to be mechanically connected to the interface of the luminaire in order for the camera module to be mechanically connected to the luminaire. The terms "mount" "attach" may be used as synonyms for the term "mechanically connect".

The interface of the luminaire and the interface of the camera module may be configured for an electrical connection by comprising one or more electrical connection elements (e.g. electrical conductors, electrical connectors) that are electrically connected respectively contacted with each other, when the interface of the camera module and the interface of the luminaire are mechanically connected to each other. Thus, the luminaire may be configured to electrically supply the camera module via an electrical connection without galvanic isolation between the interface of the luminaire and the interface of the camera, when the interface of the camera module is electrically and mechanically connected to the interface of the luminaire. At least a part of one or more matching connectors of the interface of the camera module and the interface of the luminaire for mechanically connecting the interfaces and, thus, the camera module and the luminaire with each other may form the electrical connection elements. This part may be formed of electrically conductive material. For example, the interface of the luminaire may comprise or correspond to one or more sockets and the interface of the camera module may comprise or correspond to one or more connectors that match the one or more sockets. This is correspondingly true for the vice versa case.

Optionally, the interface of the luminaire and the interface of the camera module may be configured to be electrically connected with a galvanic isolation with each other when they are mechanically connected to each other. For this the interface of the luminaire and the interface of the camera module each may comprise at least one conductor loop, preferably at least one coil that are configured to be inductively coupled with each other when the interface of the luminaire and the interface of the camera module are mechanically connected to each other. Thus, the luminaire may be configured to electrically supply the camera module with electrical energy via an inductive coupling between the interface of the luminaire and the interface of the camera module, when the interface of the camera module and the interface of the luminaire are mechanically connected to each other.

The interface of the luminaire and/or the interface of the camera module may be an interface according to the Zhaga industry standard. Optionally, the interface of the luminaire or the interface of the camera module may comprise or correspond to a socket according to the Zhaga industry standard.

Electrically supplying the camera module with electrical energy refers to electrically supplying the electrical components of the camera module with electrical energy.

The luminaire may be an outdoor luminaire or an indoor luminaire. The luminaire is optionally a street luminaire for illuminating a street area.

For an illumination, the luminaire may comprise at least one lighting means and an electrical supply circuit configured to electrically supply the at least one lighting means with electrical energy. The electrical supply circuit may comprise or correspond to at least one lighting means driver (in short driver) for providing a supply voltage and/or supply current to the at least one lighting means. The at least one driver may comprise or correspond at least one converter. The at least one converter may be at least one actively switched converter, such as at least one of a boost converter, buck converter, flyback converter, resonant converter etc. In addition or alternatively, the electrical supply circuit may comprise at least one battery, that is optionally rechargeable, for supplying the at least one lighting means with electrical energy. The at least one lighting means may comprise or correspond to one or more light emitting diodes (LEDs). Additionally or alternatively the at least one lighting means may comprise or correspond to any other lighting means known in the art. The electrical supply circuit may be configured to provide a DC voltage (e.g. 24 Volt DC). The electrical supply circuit may be implemented by any means known in the art.

The electrical supply circuit of the luminaire may be configured to electrically supply the camera module with electrical energy via the interface of the luminaire and the interface of the camera module, when the interface of the camera module is electrically and mechanically connected to the interface of the luminaire.

The at least one image sensor of the camera module may comprise or correspond to any image sensor known in the art. The at least one image sensor may comprise or correspond to at least one digital image sensor, such as at least one charge-coupled device sensor (CCD sensor) and/or at least one active-pixel sensor (CMOS sensor). The at least one image sensor may be configured to detect the image of the area within the detection field of the camera module using visible light and/or infrared radiation. The at least one image sensor may comprise or correspond to a thermal imaging sensor.

The control circuit of the camera module is configured to control the function of the camera module. The control circuit may also be referred to as processing circuit, because the control circuit may be configured to process the image data received from the at least one image sensor in order to determine information on the area by extracting the information from the image data. The control circuit may comprise or correspond to an integrated circuit (i.e. integrated control circuit), in particular a digital integrated circuit (i.e. digital integrated control circuit). The control circuit may comprise or correspond to at least one of a processor, microprocessor, controller, microcontroller, application specific integrated circuit (ASIC), field programmable gate array (FPGA) or any combination thereof.

In other words, the control circuit of the camera module may receive an image, detected by the at least one image sensor, in the form of image data (raw data) provided by the at least one image sensor. The control circuit may be configured to process the received image data (raw data) in order to determine information on the area (within the detection field of the camera module) by extracting the information from the image data.

The area within the detection field of the camera module may comprise or correspond to an area that is illuminable by the luminaire, when the interface of the camera module is electrically and mechanically connected to the interface of the luminaire. In case the luminaire is a street luminaire, the camera module may be configured to cover the street area covered by the luminaire. That is, the detection field of the camera module may comprise or correspond to the street area that is illuminable by the luminaire.

The control circuit may be configured to use artificial intelligence, e.g. a trained neural network and/or any other known trained machine learning model, for extracting the information on the area from the image data. In particular, the control circuit may apply a trained neural network and/or any other known trained machine learning model on the image data to extract information from the image data. Thus, the control circuit may use one or more machine learning algorithms, that are previously trained based on training data, for extracting the information from the image data. The training data comprises data sets, wherein each data set comprises image data for a time in association with the information for the time that may be extracted from the image data for the time.

The advantage of using machine learning algorithms is that the processing effort lays in the training of the one or more algorithms for which expensive hardware may be required. Once the training is done (e.g. at the lab respectively manufacturer), the one or more trained algorithms may be performed by a simple and, thus, low cost control circuit, such as a low cost processor. The one or more trained algorithms may be stored in a data storage of the camera module. The data storage may at least partly be part of the control circuit. The trained algorithms may be updated from extern. Preferably, the data storage comprises or corresponds to a portable data storage such as a flash driver (e.g. USB flash driver respectively USB stick) or any other known portable data storage.

In particular, a housing of the luminaire comprises the interface of the luminaire for mechanically and electrically connecting the camera module to the housing of the luminaire. In other words, the camera module may be configured to be integrated to the luminaire in the sense that the housing of the luminaire is provided with the interface of the luminaire and the interface of the camera module may be electrically and mechanically connected to the interface of the luminaire so that the camera module is mechanically connected respectively attached to the housing of the luminaire.

The interface of the luminaire may be arranged at the luminaire, in particular at the housing of the luminaire, and the interface of the camera module may be arranged at the camera module such that the at least one image sensor of the camera module is configured to detect an image of an area that is illuminable by the luminaire, when the interface of the camera module is electrically and mechanically connected to the interface of the luminaire.

As outlined above, in case the luminaire is a street luminaire, the area may correspond to a street area that is illuminable by the luminaire.

The information on the area may comprise at least one of:
an occupancy, optionally an occupancy rate (e.g. occupancy per time period), of the area with one or more physical objects, optionally with one or more persons and/or vehicles;
a movement of the one or more physical objects, optionally of the one or more persons and/or vehicles;
information on distance between persons, when persons are present in the area;
one or more characteristics of the one or more physical objects, optionally the type of the one or more physical objects; and
a condition of the area, optionally a street condition of the area (e.g. one or more street condition parameters).

The information on distance between persons, when the persons are present in the area may correspond to a social distancing information. For example, in case the distance between the persons is greater than a threshold for the distance, the social distancing information may inform that social distancing in the area detected by the camera module is sufficient for preventing or reducing spread of a disease, such as a bacterial or virus disease. Otherwise, in case the distance between the persons is smaller than or equal to the threshold value for the distance, the social distancing information may inform that the social distancing in the area detected by the camera module is insufficient.

In case of an indoor luminaire and, thus, indoor area, a condition of the area may comprise or correspond to a cleanliness condition of the area. In case of an outdoor luminaire (e.g. a street luminaire) and thus an outdoor area (e.g. a street area), the condition of the area may comprise or correspond to a weather condition at the area and/or a surface condition of the area (e.g. snow and/or ice on the surface, wet surface, damaged surface, oil of a vehicle on the surface etc.).

In case the area detected by the camera module corresponds to a street area, the information may comprise at least one of
information on traffic with regard to vehicles and/or people;
street condition (e.g. snow and/or ice on the street, wet street surface, presence of street surface damage such as one or more potholes, oil of a vehicle on the surface etc.); and
information on street ageing (presence of street surface damage such as one or more potholes, state of street markings).

In case the area detected by the camera module corresponds to a parking lot area the information may comprise at least one of
a status of one or more parking slots of the parking lot area, wherein the status may vary between occupied and free;
a status of the parking lot area, wherein the status may vary between occupied and free;
a condition of the one or more parking slots of the parking lot area (e.g. snow and/or ice at a respective parking slot, a damaged surface at the respective parking slots);
a general condition of the parking lot area (e.g. snow and/or ice at parking lot, a damaged surface at the parking lot);
information on an ageing of the one or more parking slots of the parking lot area (e.g. presence of surface damage, state of parking lot markings); and
information on an ageing of the parking lot area (e.g. presence of surface damage, state of parking lot markings).

The parking lot area may be an indoor area (indoor parking lot) or an outdoor area (outdoor parking lot).

The training data for training the one or more machine learning algorithms, that may be used by the control circuit of the camera module for determining the information on the area based on the image data, may comprise a plurality of data sets. Each data set may comprise image data of the at least one image sensor for a time in association with at least one of the following for the time:
- an indicator indicative of an occupancy of the area with one or more physical objects, optionally of an occupancy with one or more persons and/or vehicles;
- an indicator indicative of the movement of the one or more physical objects, optionally of the one or more persons and/or vehicles;
- an indicator indicative on a distance between persons, when persons are present in the area;
- one or more characteristics of the one or more physical objects, optionally the type of the one or more physical objects; and
- a condition of the area, optionally a street condition of the area.

The camera module may comprise a communication interface configured to communicate with extern. Optionally the communication interface of the camera module is configured to wirelessly communicate with extern. The communication interface of the camera module may be configured to wirelessly communicate according to the W-LAN industry standard, the Bluetooth industry standard or any other known industry standard for wireless communication. The camera module may be autonomous with regard to communication.

The luminaire may comprise a communication interface configured to communicate with extern. Optionally, the communication interface of the luminaire is configured to wirelessly communicate with extern. The communication interface of the luminaire and the communication interface of the camera module may be configured to communicate with each other. The communication interface of the luminaire may be configured to wirelessly communicate according to the W-LAN industry standard, the Bluetooth industry standard or any other known industry standard for wireless communication The communication interface of the luminaire and the communication interface of the camera module may be configured to wirelessly communicate with each other. Additionally or alternatively, the communication interface of the luminaire may be part of the interface of the luminaire and the communication interface of the camera module may be part of the interface of the camera module so that the communication interface of the luminaire and the communication interface of the camera module are configured to communicate with each other, when the interface of the camera module is electrically and mechanically connected to the interface of the luminaire.

Additionally or alternatively, the communication interface of the luminaire may be at least partly a part of the interface of the luminaire and the communication interface of the camera module may be at least partly a part of the interface of the camera module so that the communication interface of the luminaire and the communication interface of the camera module are configured to communicate with each other, when the interface of the camera module is electrically and mechanically connected to the interface of the luminaire.

Thus, the interface of the luminaire may comprise or correspond to a mechanical, electrical supply and communication interface. The interface of the camera module may comprise or correspond to a mechanical, electrical supply and communication interface matching the interface of the luminaire.

The interface of the luminaire and the interface of the camera module may be configured to communicate with each via the electrical connection between the two interfaces, when the interface of the luminaire and the interface of the camera module are electrically and mechanically connected to each other.

The communication interface of the camera module may be formed by two or more communication interface parts, wherein a first communication interface part may be part of the mechanical and electrical interface of the camera module and a second communication interface part may be separate of the mechanical and electrical interface.

For example, the first communication interface part may comprise or correspond to at least one electrical connection element (e.g. electrical conductor, electrical connector) or at least one conductor loop, optional at least one coil, of the camera module. The first communication interface part of the camera module may be configured to communicate wired (via the at least one electrical connection element) or wirelessly (via an inductive coupling of the at least one conductor loop, optional at least one coil) with the communication interface of the luminaire (being at least partly a part of the interface of the luminaire), when the interface of the camera module and interface of the luminaire are electrically and mechanically connected to each other. Optionally, the at least one electrical connection element or at least one conductor loop corresponds to the at least one electrical connection element or at least one conductor loop of the interface of the camera module, via which the camera module may be electrically supplied from the interface of the luminaire. That is, optionally the at least one electrical connection element or at least one conductor loop of the interface of the camera module may be used for both, the electrical supply of the camera module from the interface of the luminaire and communication with the communication interface of the luminaire.

The second communication interface part may comprise or correspond to a communication unit of the camera module that is configured to communication with extern (outside the camera module). Optionally the communication unit may be configured to wirelessly communicate with extern.

The communication interface of the luminaire may be formed by two or more communication interface parts, wherein a first communication interface part may be part of the mechanical and electrical interface of the luminaire and a second communication interface part may be separate of the mechanical and electrical interface of the luminaire. For example, the first communication interface part may comprise or correspond to at least one electrical connection element (e.g. electrical conductor, electrical connector) or at least one conductor loop, optional at least one coil, of the luminaire. The first communication interface part of the luminaire may communicate wired (via the at least one electrical connection element) or wirelessly (via an inductive coupling of the at least one conductor loop, optional at least one coil) with the communication interface of the camera module (being at least partly a part of the interface of the camera module), when the interface of the camera module and interface of the luminaire are electrically and mechanically connected to each other. Optionally, the at least one electrical connection element or at least one conductor loop corresponds to the at least one electrical connection element or at least one conductor loop of the interface of the luminaire, via which the luminaire may electrically supply via the interface of the camera module the camera module. That is, optionally the at least one connection element or at least one conductor loop of the interface of the luminaire may be used for both, the electrical supply of the camera module via the interface of the camera module and communication with the communication interface of the camera module.

The second communication interface part may comprise or correspond to a communication unit of the luminaire that is configured to communication with extern (outside the camera module). Optionally the communication unit may be configured to wirelessly communicate with extern.

Optionally, the control circuit of the camera module is configured to transmit, via the communication interface of the camera module, the determined information on the area to the communication interface of the luminaire. The communication interface of the luminaire may be configured to provide the determined information on the area, received from the communication interface of the camera module, to a control circuit of the luminaire for controlling illumination of the luminaire.

The illumination of the luminaire corresponds to the light emitted by the luminaire. Thus, controlling illumination of the luminaire corresponds to controlling a light emission by the luminaire respectively controlling the light emitted by the luminaire. The passages "illumination of the luminaire" and "illumination by the luminaire" are used as synonyms.

The control circuit of the luminaire may comprise or correspond to an integrated circuit (i.e. integrated control circuit), in particular a digital integrated circuit (i.e. digital integrated control circuit). The control circuit of the luminaire may comprise or correspond to at least one of a processor, microprocessor, controller, microcontroller, application specific integrated circuit (ASIC), field programmable gate array (FPGA) or any combination thereof.

The control circuit may be electrically supplied by any means known in the art.

The luminaire may comprise a wired bus electrically connected to a control circuit of the luminaire for controlling illumination of the luminaire, and the communication interface of the luminaire. The wired bus is optionally a DALI bus or DALI-2 bus. The communication interface of the camera module may be configured to communicate with the control circuit of the luminaire via the communication interface and the wired bus of the luminaire. DALI and DALI-2 are two industry standards well known in the field of lighting and, thus, no further details are provided with regard to them. A DALI bus may be understood as a bus via which communication takes place according to the DALI industry standard. The same applies for the DALI-2 bus.

The electrical supply circuit of the luminaire may be configured to electrically supply the wired bus. The wired bus may be electrically supplied by any means known in the art.

The communication interface of the luminaire may be a DALI or DALI-2 interface. That is, the communication interface of the luminaire may be configured to communicate according to the DALI industry standard or the DALI-2 industry standard. The communication interface of the camera module may be a DALI or DALI-2 interface. That is, the communication interface of the camera module may be configured to communicate according to the DALI industry standard or the DALI-2 industry standard.

The communication interface of the luminaire may comprise or correspond to at least one electrical connection element (e.g. electrical connector) connected to the wired bus (may be referred to as "at least one bus connection element" of the luminaire). The communication interface of the camera module may comprise or correspond to at least one electrical connection element (e.g. electrical connector) matching the at least one bus connection element of the luminaire. This at least one electrical connection element of the camera module may be referred to as "at least one bus connection element" of the camera module. The at least one bus connection element of the luminaire and the at least one bus connection element of the camera module may be arranged such that they are connected to each other, when the interface of the camera module is electrically and mechanically connected to the interface of the luminaire.

The communication interface of the luminaire and the communication interface of the camera module may be configured such that the communication interface of the camera module is electrically connected via the communication interface of the luminaire to the wired bus using an inductive coupling between the communication interface of the luminaire and the communication interface of the camera module.

The control circuit of the camera module may be configured to transmit via the communication interface of the camera module to the communication interface of the luminaire one or more bus signals for controlling the illumination by the luminaire based on the determined information on the area, and/or the determined information on the area. The communication interface of the luminaire may be configured to input the one or more bus signals and/or the determined information on the area, received from the communication interface of the camera module, to the wired bus of the luminaire.

In other words, the camera module may be configured to transmit to the wired bus of the luminaire, i.e. input to the bus communication of the luminaire, light related information in the form of one or more bus signals for controlling the illumination by the luminaire (i.e. light related information for which the wired bus originally has been defined). In addition or alternatively, the camera module may be configured to transmit to the wired bus of the luminaire, i.e. input to the bus communication of the luminaire, information (e.g. movement, occupancy rates, street condition parameters etc.) determined by the control circuit of the camera module based on image data.

The aforementioned has the advantage that the control circuit of the camera module may directly control the illumination of the luminaire dependent on the determined information. In particular, the control circuit of the camera module may be configured to control the electrical supply of the at least one lighting means of the luminaire based on the determined information (by communicating via the communication interface of the camera module to the communication interface of the luminaire one or more bus signals). Providing the determined information to the control circuit of the luminaire has the advantage that the control circuit of the luminaire may control the illumination of the luminaire dependent on the determined information. The control circuit of the luminaire may be configured to control the illumination by the luminaire based on the determined information that is receivable from the wired bus. In particular, the control circuit of the camera module may be configured to control the electrical supply of the at least one lighting means of the luminaire based on the determined information.

In particular, the control circuit of the camera module may be configured to control the illumination of the luminaire by controlling the light intensity (amount of light), a color and/or a pattern of light emitted by the luminaire. That is, the control circuit of the camera module may be configured to change the light intensity, the color and/or the pattern of the light emitted by the luminaire. For a color change the at least one lighting means of the luminaire (i.e. the light source of the luminaire) may be configured to change the color of the emitted light. For example, the at least one lighting means may comprise or correspond to a plurality of lighting means of two or more colors. A pattern of the light emitted by the luminaire may be achieved by turning the at least one lighting means on and off or changing the light intensity of the light emitted by the at least one lighting means according to a pattern. For example, the control circuit of the camera module may be configured to control the illumination of the luminaire such that the light emitted by the luminaire is a flashing respectively blinking light.

For example, in case the determined information on the area comprises or corresponds to no occupancy of the area with one or more physical objects (such as persons and/or vehicles), the control circuit of the camera module may be configured to control the illumination of the luminaire such that the illumination is turned off or decreased to a lower light intensity. This allows to save energy in cases where no illumination is needed because there is not occupancy of the area. In this case the area of which the information is determined by the control circuit of the camera module may comprise at least the area that is illuminable by the luminaire. Accordingly, in case the determined information on the area comprises or corresponds to an occupancy of the area with one or more physical objects (such as persons and/or vehicles) and/or a movement of the one or more physical objects, the control circuit of the camera module may be configured to control the illumination of the luminaire such that the illumination is turned on or increased to a light intensity of normal operation.

The control circuit of the camera module may be configured to control the illumination by the luminaire based on the determined information on the area such that the illumination by the luminaire informs on at least one part of the determined information, in particular warns about the at least one part of the determined information.

For example, in case the determined information on the area comprises or corresponds to information on traffic with regard to vehicles indicating a traffic jam (congestion), the control circuit of the camera module may be configured to control the illumination by the luminaire such that the color of the illumination is changed (e.g. from white color to a red color), and/or a pattern of the emitted light is changed (e.g. from a constant light emission to a blinking respectively flashing light emission). This allows warning a driver of a vehicle from a distance about the traffic jam, because the driver may see the changed color and/or established pattern of light emission of the illumination by the luminaire from a distance, which increases the attention of the driver Moreover, in case the determined information on the area comprises or corresponds to information on traffic with regard to vehicles, the control circuit of the camera module may be configured to control the illumination of the luminaire such that the light intensity (that is a dimming degree) of the light emitted by the luminaire is changed.

Further, in case the determined information on the area comprises or corresponds to information on a distance between persons, when persons are present in the area, the control circuit of the camera module may be configured to change a color and/or pattern of the illumination by the luminaire, in case the distance between the person is smaller than or equal to a threshold value for the distance. Namely, in this case the distance between the persons may be not sufficient for preventing or reducing a spread of a disease, such as a bacterial or virus disease. Changing the color and/or pattern of the illumination by the luminaire may warn the persons about the missing social distancing, i.e. the too small distance between the persons, so that the persons may increase the distance to other person and, thus, enable social distancing sufficient for preventing or reducing e.g. the spread of a disease.

Furthermore, in case the determined information on the area comprises or corresponds to a status of one or more parking slots of a parking lot area (the status may vary between occupied and free), the control circuit of the camera module may be configured to change a color and/or pattern of the illumination by the luminaire in order to inform about the different statuses of the parking slots. For example, in case at least one of the one or more parking slots are free, the control circuit of the camera module may be configured to control the illumination by the luminaire, such that the luminaire emits light of a green color (optionally periodically for a short time period). This may inform a person seeing the light emitted by the luminaire that there is at least one free parking slot at the parking lot.

The above description with respect to the control, by the control circuit of the camera module, of the illumination by the luminaire (i.e. of the light emission by the luminaire) is correspondingly valid for the control circuit of the luminaire. That is, the control circuit of the luminaire may be configured to control (based on the determined information on the area) the illumination by the luminaire in the same way as is described above for the control circuit of the camera module.

The control circuit of the camera module may be configured to transmit via the communication interface of the camera module to the communication interface of the luminaire the determined information on the area and the communication interface of the luminaire may be configured to provide the information to the control circuit of the luminaire. The control circuit of the luminaire may be configured to control the illumination by the luminaire based on the information received from the camera module. In particular, the control circuit of the camera module may be configured to control the electrical supply of the at least one lighting means of the luminaire based on the information received from the camera module.

Transmitting the determined information on the area from the camera module to the luminaire instead of the image data (raw data) on which the control circuit of the camera module determines the determined information reduces bandwidth issues. In addition, this maintains privacy since no images detected by the at least one image sensor of the camera module have to be stored in the form of the image data (raw data) and no images are communicated (in the form of image data) from the camera module to the luminaire.

The communication, in particular transmitting, of information by the camera module to the luminaire may be a broadcasting of the information.

Optionally, the system comprises a gateway for communicating with a network. The network may be a cloud network. The communication interface of the luminaire may be configured to wirelessly communicate with the gateway. Additionally or alternatively the communication interface of the camera module may be configured to wirelessly communicate with the gateway.

The communication interface of the luminaire may be configured to wirelessly transmit data received from the communication interface of the camera module to the gateway. The data are optionally the determined information on the area. Additionally or alternatively, the communication interface of the camera module may be configured to wirelessly transmit data, optionally the determined information on the area, to the gateway.

Transmitting the determined information on the area from the camera module and/or the luminaire to the gateway instead of the image data (raw data) on which the control circuit of the camera module determines the determined information reduces bandwidth issues. This also maintains privacy since no images detected by the at least one image sensor of the camera module have to be stored in the form of the image data (raw data) and no images are communicated (in the form of image data) from the camera module and/or the luminaire to the gateway.

The communication, in particular transmitting, of information by the camera module and/or luminaire to the gateway may be a broadcasting of the information.

Optionally, the system comprises two or more of the luminaire, and the camera module is configured to be electrically and mechanically connected to one of the two or more of the luminaire. In other words, the system may comprise two or more luminaires, wherein each luminaire is implemented as described above with regard to the luminaire of the system. That is, the above description with regard to the luminaire of the system is valid for each luminaire of the optional two or more luminaires of the system. The camera module may be configured to be electrically and mechanically connected to one of the two or more luminaires.

Optionally, the two or more of the luminaire may be configured to wirelessly communicate with each other.

Further, the system comprises optionally two or more of the camera module, and each of the two or more of the camera module is configured to be electrically and mechanically connected to a respective one of the two or more of the luminaire. With other words, the system may comprise two or more camera modules, wherein each camera module is implemented as described above with regard to the camera module of the system. That is, the above description with regard to the camera module of the system is valid for each camera module of the optional two or more camera modules of the system. Each of the two or more camera modules may be configured to be electrically and mechanically connected to a respective one of the two or more luminaires.

Optionally, the two or more of the camera module are configured to wirelessly communicate with each other. In other words, the two or more camera modules may be configured to wirelessly communicate with each other.

In order to achieve the system according to the first aspect of the present invention, some or all of the above described optional features may be combined with each other.

A second aspect of the present invention provides a system comprising a luminaire, a camera module and a gateway for communicating with a network. The luminaire is optionally an outdoor luminaire. The network is optionally a cloud network. The luminaire and the camera module each comprise an interface for mechanically and electrically connecting the camera module and the luminaire with each other. The camera module is configured to be mechanically and electrically connected to the luminaire by mechanically and electrically connecting the interface of the camera module to the interface of the luminaire. The luminaire is configured to electrically supply the camera module with electrical energy via the interface of the luminaire and the interface of the camera module, when the interface of the camera module is electrically and mechanically connected to the interface of the luminaire. The luminaire comprises a communication interface configured to wirelessly communicate with the gateway, and the camera module comprise a communication interface configured to communicate with the wireless communication interface of the luminaire.

A third aspect of the present invention provides a system comprising a luminaire, a camera module and a gateway for communicating with a network. The luminaire is optionally an outdoor luminaire. The network is optionally a cloud network. The luminaire and the camera module each comprise an interface for mechanically and electrically connecting the camera module and the luminaire with each other. The camera module is configured to be mechanically and electrically connected to the luminaire by mechanically and electrically connecting the interface of the camera module to the interface of the luminaire. The luminaire is configured to electrically supply the camera module with electrical energy via the interface of the luminaire and the interface of the camera module, when the interface of the camera module is electrically and mechanically connected to the interface of the luminaire. The camera module comprises a communication interface configured to wirelessly communicate with the gateway.

The above description of the system according to the first aspect of the present invention is correspondingly valid for the system according to the second aspect of the present invention and the system according to the third aspect of the present invention. The system according to the second aspect and the system according to the third aspect achieve the same advantages as the system according to the first aspect of the present invention, described above.

BRIEF DESCRIPTION OF THE DRAWINGS

In the following, the invention is described exemplarily with reference to the enclosed figures, in which FIG. 1 exemplarily shows a schematic side view of a system according to an embodiment of the present invention.

DETAILED DESCRIPTION OF THE PREFERRED EMBODIMENT

In the Figures, corresponding elements have the same reference signs. The proportions and dimensions of the elements shown in FIGS. 1 and 2 do not represent the elements of the system to scale, but are merely chosen to describe the function of the system.

Figure 1:
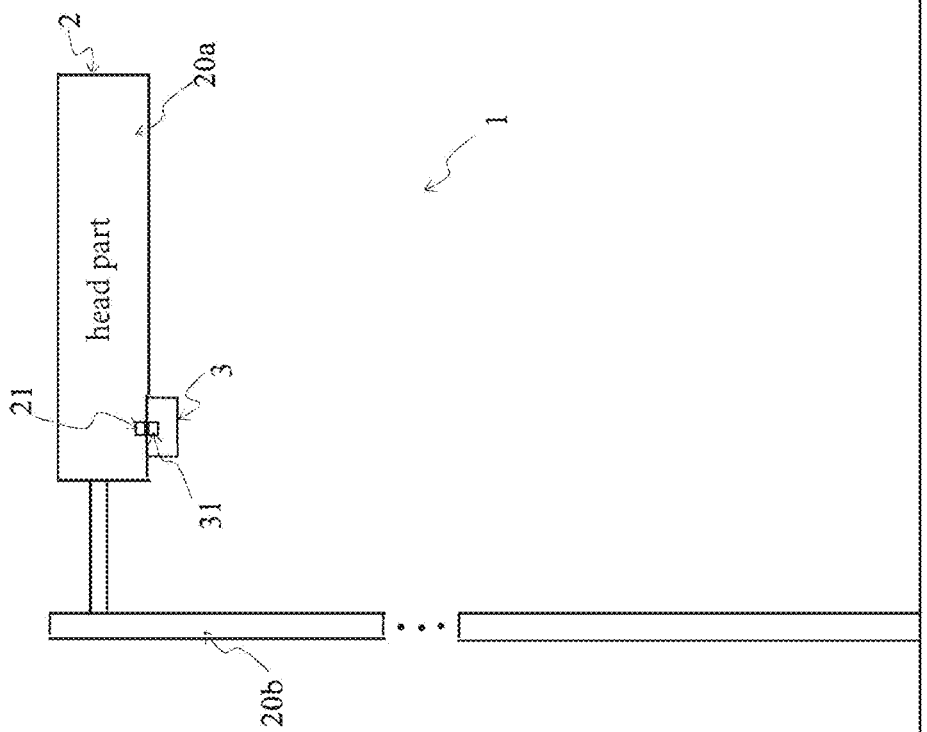

FIG. 1 exemplarily shows a schematic side view of a system according to an embodiment of the present invention.

The system 1 of FIG. 1 comprises a luminaire 2 and a camera module 3. The above description of the system according to the first aspect of the present invention is correspondingly valid for the system 1 of FIG. 1. The luminaire 2 of FIG. 1 is exemplarily a street luminaire. As described above the present invention is not limited to a street luminaire and may be any other outdoor luminaire or any indoor luminaire known in the art. Therefore, the following description is correspondingly valid for any other luminaire type. The luminaire 2 may comprise a head part 20a comprising at least one lighting means for providing the illumination by the luminaire 2 and a pole 20b for positioning the head part over ground (e.g. a ground).

As shown in FIG. 1, the luminaire 2 may comprise a mechanical and electrical interface 21 (may be abbreviated by "interface"). The camera module 3 may comprise a mechanical and electrical interface 31 (may be abbreviated by "interface"). The two interfaces 21 and 31 are configured to be mechanically and electrically connected to each other in order to electrically and mechanically connect the camera module 3 to the luminaire 2. This state is shown in FIG. 1.

The interface 21 of the luminaire 2 is arranged at the luminaire 2 and the interface 31 of the camera module 3 is arranged at the camera module 3 such that the camera module (in particular at least one image sensor of the camera module) is configured to detect at least an area that is illuminated by the luminaire 1, when the interface 21 of the luminaire 2 and the interface 31 of the camera module 3 are electrically and mechanically connected to each other. The luminaire 2 is configured to electrically supply the camera module 3 via the interface 21 and the interface 31, when the interface 21 and the interface 31 are electrically and mechanically connected to each other.

According to FIG. 1, the interface 21 of the luminaire 2 is arranged at the head part 21 of the luminaire 2. This is only by way of example and, thus, the interface 21 of the luminaire 2 may be arranged at a different position of the luminaire 2, e.g. at the pole 20b, as long as the detection field of the camera module 3 comprises an area that is relevant with regard to the illumination by the luminaire 2, when the interface 31 of the camera module 3 is electrically and mechanically connected to the interface 21 of the luminaire 2. The position of the interface 31 at the camera module 3 may be different compared to the one shown in FIG. 1. For example the interface 21 may be arranged at a side of the pole 20b and the interface 31 may be arranged at a side of the camera module 3.

For further information on the system 1 of FIG. 1, in particular the function and components of the luminaire 2 and the camera module 3, reference is made to the above description of the system according to the first aspect of the present invention and the following description of FIGS. 2 to 7.

Figure 2:
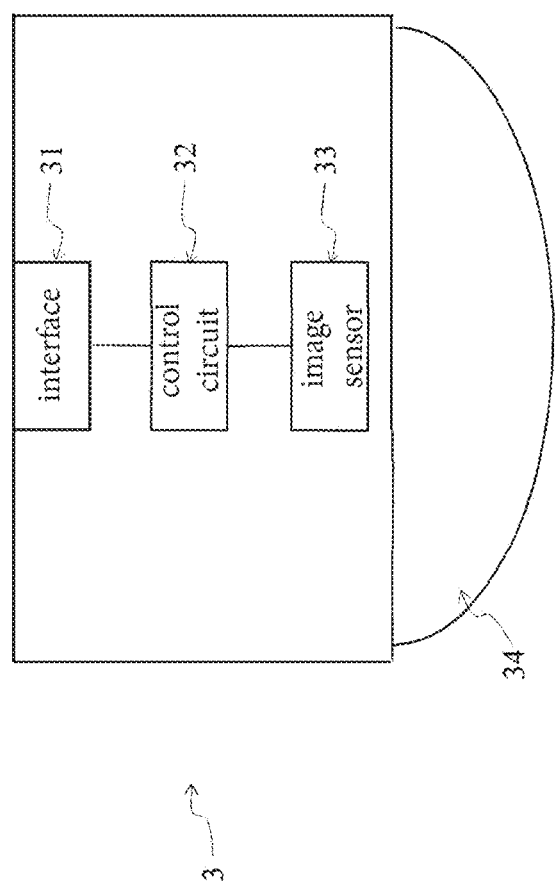
FIG. 2 exemplarily shows a schematic side view of a camera module of a system according to an embodiment of the present invention, wherein the function of the camera module is presented in form of an exemplary block diagram.

FIG. 2 exemplarily shows a schematic side view of a camera module of a system according to an embodiment of the present invention, wherein the function of the camera module is presented in form of an exemplary block diagram.

The above description of the camera module of the system according to the first aspect of the present invention is correspondingly valid for the camera module of FIG. 2.

As shown in FIG. 2, the camera module 3 may comprise an interface 31 for electrically and mechanically connecting the camera module 3 to a corresponding interface of a luminaire of the system (not shown in FIG. 2). The camera module 3 may be electrically supplied via the interface 31 from the interface of the luminaire, when the interface 31 is electrically and mechanically connected to the interface of the luminaire. The camera module 3 further may comprise a control circuit 32 and at least one image sensor 33. The control circuit 32 and the at least one image sensor 33 may be electrically supplied with electrical energy via the interface 31. The at least one image sensor 33 is configured to detect an image of an area within the detection field of the camera module 3 and provide the image in the form of image data to the control circuit 32. The control circuit 32 is configured to determine information on the area by extracting the information from the image data. The camera module 3 may in addition comprise an optical arrangement 34 comprising one or more lenses. The optical arrangement 34 may be configured to adjust the detection field of the camera module 3. The optical arrangement may be implemented according to any optical arrangement known in the art.

For further details on the camera module 3, in particular the information that may be determined by the control circuit 32 based on the image data provided by the at least one image sensor 33, reference is made to the above description of the system according to the first aspect of the present invention and the following description of FIGS. 3 to 7.

Figure 3:
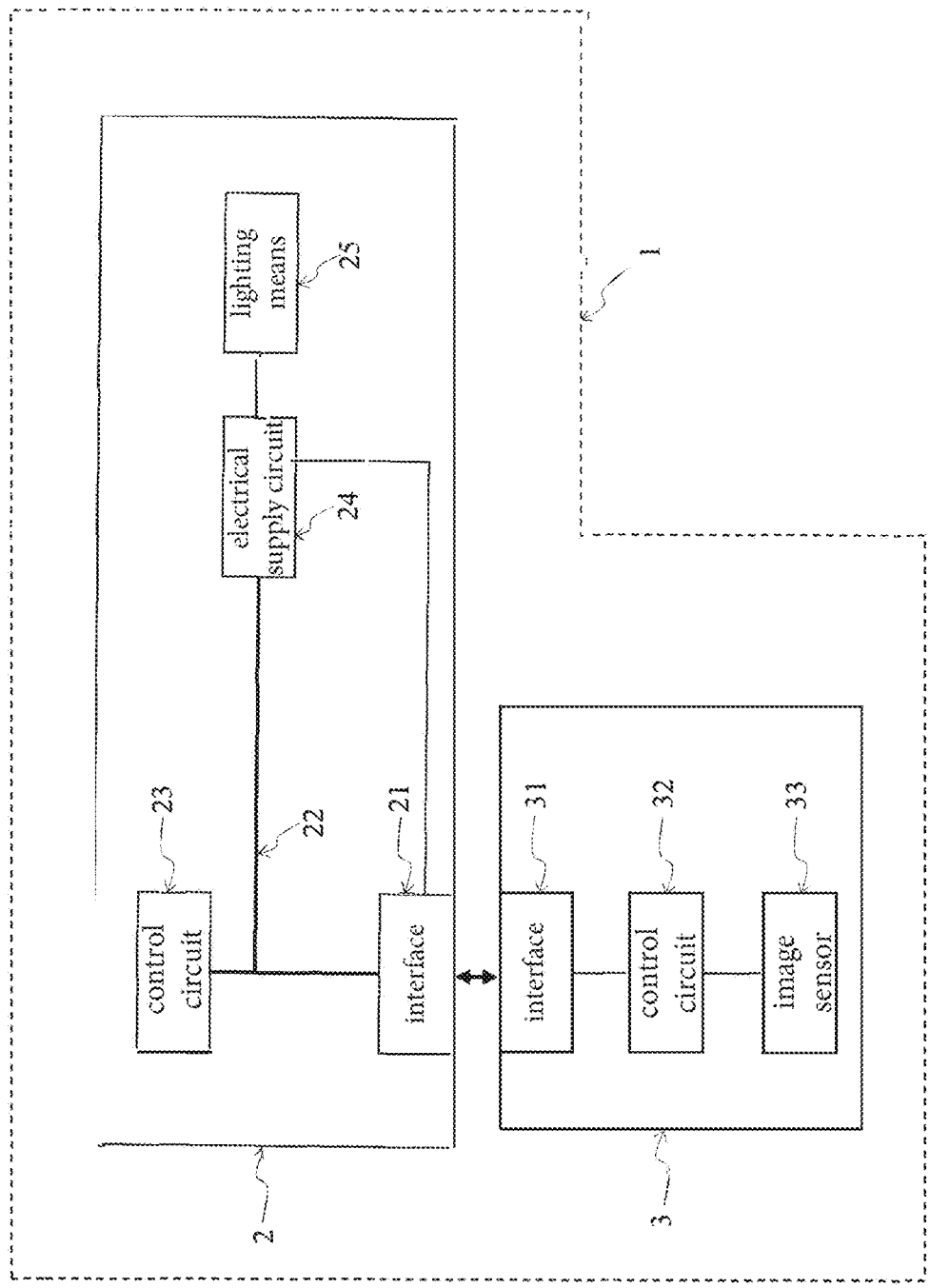
FIG. 3 exemplarily shows a block diagram of a system according to an embodiment of the present invention.

FIG. 3 exemplarily shows a block diagram of a system according to an embodiment of the present invention.

FIG. 3 shows an embodiment according to which, the luminaire 2 comprises a communication interface and the camera module 3 comprises a communication interface, wherein the communication interface of the luminaire 2 is part of the mechanical and electrical interface 21 of the luminaire 2 and the communication interface of the camera module 3 is part of the mechanical and electrical interface 31 of the camera module 3. Thus, according to the embodiment of FIG. 3, the luminaire 2 and the camera module 3 may communicate with each other via the interface 21 of the luminaire 2 and the interface 31 of the camera module 3, when the interface 31 of the camera module 3 is electrically and mechanically connected to the interface 21 of the luminaire 2.

As shown in FIG. 3, the luminaire 2 may comprise a control circuit 23 configured to control the illumination by the luminaire 2; at least one lighting means 25 configured to provide the illumination by the luminaire 2 and an electrical supply circuit 24 configured to electrically supply the at least one lighting means 25 with electrical energy. That is, the at least one lighting means 25 corresponds to the lighting source of the luminaire 2. The electrical supply circuit 24 may be connected to an external energy source, such as mains (not shown in FIG. 3). The electrical supply of the control circuit 23 is not shown in FIG. 3 and may be implemented by any means known in the art. As indicated in FIG. 3, the luminaire 2 may provide electrical energy from the electrical supply circuit 24 via the interface 21 to the interface 31 of the camera module 3 for electrically supplying the camera module 3, when the interfaces 21 and 31 are electrically and mechanically connected to each other.

The luminaire 2 may comprise a wired bus 22, such as a DALI bus or DALI-2 bus, allowing communication between the components connected to the bus 22. The control circuit 23, the electrical supply circuit 24 and the interface 21 may be connected to the wired bus 22. The electrical supply of the wired bus 22 is not shown in FIG. 3 and may be implemented by any means known in the art. Optionally, the electrical supply circuit 24 may be configured to electrically supply the wired bus 22.

The control circuit 23 may be configured to control the electrical supply circuit 24 by communicating one or more bus signals via the wired bus 22 to the electrical supply circuit 24. In particular, the control circuit 23 may be configured to control the amount of electrical energy provided by the electrical supply circuit 24 to the at least one lighting means 25 and, thus, may control the amount of light emitted by the at least one lighting means 25. The greater the average electrical energy supplied from the electrical supply circuit 24 to the lighting means during a time period the greater is the average amount of light emitted by the at least one lighting means 25 during the time period. The control circuit 23 may receive data via the wired bus from the interface 21, wherein the data are received by the interface 21 from the interface 31 of the camera module 3.

In particular, the control circuit 32 of the camera module 3 may be configured to communicate via the interface 31 of the camera module 3 data to the interface 21 of the luminaire 2. The interface 21 may be configured to input the received data to the wired bus 22. Thus, the data received by the interface 21 of the luminaire 2 may be received by any component of the luminaire 2 connected to the wired bus 22. The data may comprise or correspond to one or more bus signals for controlling the illumination by the luminaire 2 based on information determined by the control circuit 32 of the camera module 3. In addition or alternatively, the data may comprise or correspond to the information determined by the control circuit 32 of the camera module 3.

The control circuit 23 of the luminaire 2 may be configured to control the illumination by the luminaire, i.e. the light emission by the at least one lighting means 25, based on information received from the camera module 3 (via the interface 31 of the camera module 3, the interface 21 of the luminaire 2 and the wired bus 22). This information comprises or corresponds to information that may be determined by the control circuit 32 of the camera module 3 by extracting the information from image data, which the control circuit 32 may receive from the at least one image sensor 33 of the camera module 3. In addition, the control circuit 31 of the camera module 3 may be configured to control the illumination by the luminaire, i.e. the light emission by the at least one lighting means 25, based on the information determined by the control circuit 32. For this, the control circuit 31 of the camera module 3 may be configured to communicate via the interface 31 of the camera module 3, the interface 21 of the luminaire 2 and the wired bus 22 one or more bus signals to the electrical supply circuit 24. The one or more bus signals may control the electrical energy provided by the electrical supply circuit 24 to the at least one lighting means 25 and, thus, the light emitted by the at least one lighting means 25. Namely, the light emitted by the at least one lighting means 25 and, thus, the illumination by the luminaire 2 is dependent on the electrical energy provided by the electrical supply circuit 24 to the at least one lighting means 25.

For further information on the system 1 of FIG. 3, in particular the function and components of the luminaire 2 and the camera module 3, reference is made to the above description of the system according to the first aspect of the present invention and the following description of FIGS. 4 to 7.

Figure 4:
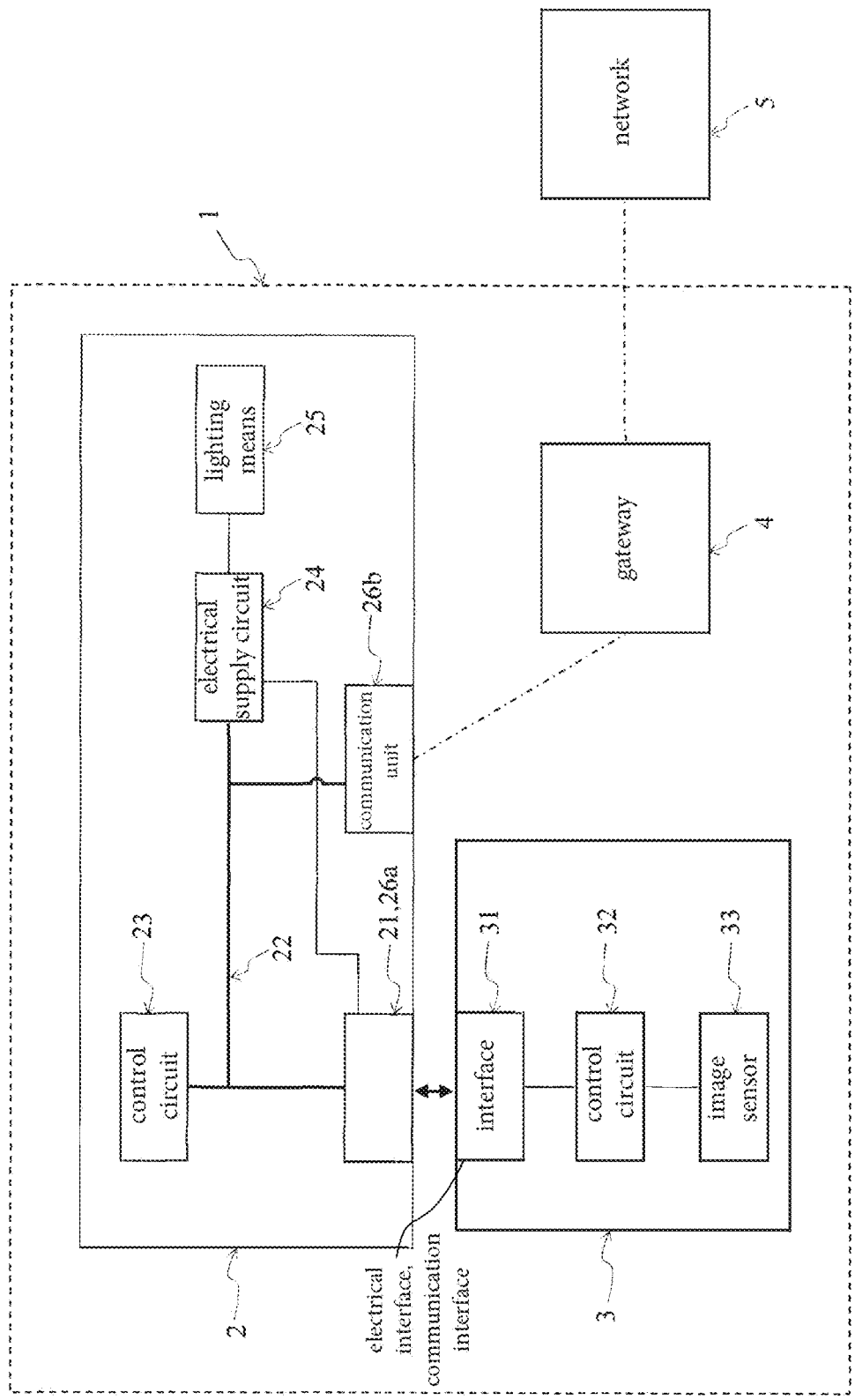
FIG. 4 exemplarily shows a block diagram of a system according to an embodiment of the present invention.

FIG. 4 exemplarily shows a block diagram of a system according to an embodiment of the present invention.

The system of FIG. 4 essentially corresponds to the system of FIG. 3 and, thus, in the following mainly the difference, in particular the additional features shown in FIG. 4 are described. The above description of the system of FIG. 3 is correspondingly valid for the system of FIG. 4.

As shown in FIG. 4, the communication interface of the luminaire 2 may be formed by two communication interface parts, wherein a first communication interface part 26a may be part of the mechanical and electrical interface 21 of the luminaire 2 and a second communication interface part 26b may be separate of the mechanical and electrical interface 21 of the luminaire 2.

For example, the first communication interface part 26a may comprise or correspond to at least one electrical connection element (e.g. electrical connector) or at least one conductor loop, optional at least one coil, of the luminaire 2. The first communication interface part 26a of the luminaire 2 may be configured to communicate wired (via the at least one electrical connection element) or wirelessly (via an inductive coupling of the at least one conductor loop, optional at least one coil) with the communication interface of the camera module 3 (being at least partly a part of the interface 31 of the camera module 3). According to the embodiment of FIG. 4, the communication interface of the camera module 3 is part of the mechanical and electrical interface 31 of the camera module 3.

The second communication interface part 26b may comprise or correspond to a communication unit 26b of the luminaire 2 that is configured to communication with extern (outside the luminaire 2). As indicated in FIG. 4, the communication unit 26b may be configured to wirelessly communicate with extern.

The system 1 may further comprise a gateway 4, wherein the gateway 4 is configured to communicate with a network 5. The network 5 may be a cloud network. As indicated by the stripped line between the communication unit 26b of the luminaire 2 and the gateway 4, the communication interface of the luminaire 2, in particular the communication unit 26b (being a part of the communication interface of the luminaire 2), may be configured to wirelessly communicate with the gateway 4.

The communication unit 26b of the luminaire 2 may be electrically connected to the control circuit 23 of the luminaire 2, so that the control circuit 23 may be configured to communicate via the communication unit 26b with extern, e.g. with the gateway 4. As shown in FIG. 4, the communication unit 26b may be electrically connected to the wired bus 22 and, thus, is electrically connected via the wired bus 22 to the control circuit 23. The communication unit 26b may be configured to communicate data communicated via the wired bus 22 (respectively present on the wired bus 22) to extern, optionally without being controlled by the control circuit 23. Thus, the communication unit 26b may be configured to communicate, to extern (e.g. to the gateway 4), information that is received by the interface 21, in particular the first part 26a of the communication interface, of the luminaire 2 and input to the wired bus 22.

Alternatively, the communication interface of the luminaire 2 may comprise or correspond to only the communication unit 26b configured to wirelessly communicate with extern (not shown in FIG. 4). In this case, the communication interface of the camera module 3 may comprise or correspond to only a communication unit configured to wirelessly communicate with extern, wherein the communication unit of the camera module 3 is electrically connected to the control circuit 32 of the camera module 3. Thus, the communication interface of the luminaire 2, in particular the communication unit 26b, and the communication interface of the camera module 3, in particular the communication unit of the camera module, may be configured to wirelessly communicate with each other. The communication unit 26b of the luminaire 2 may be configured to wirelessly communicate with the gateway 4.

For more information on the system of FIG. 4, in particular on the communication between the communication interface of the luminaire 2 with the gateway 4 and the communication between the gateway 4 and the network 5, reference is made to the above description of the system according to the first aspect of the present invention.

Figure 5:
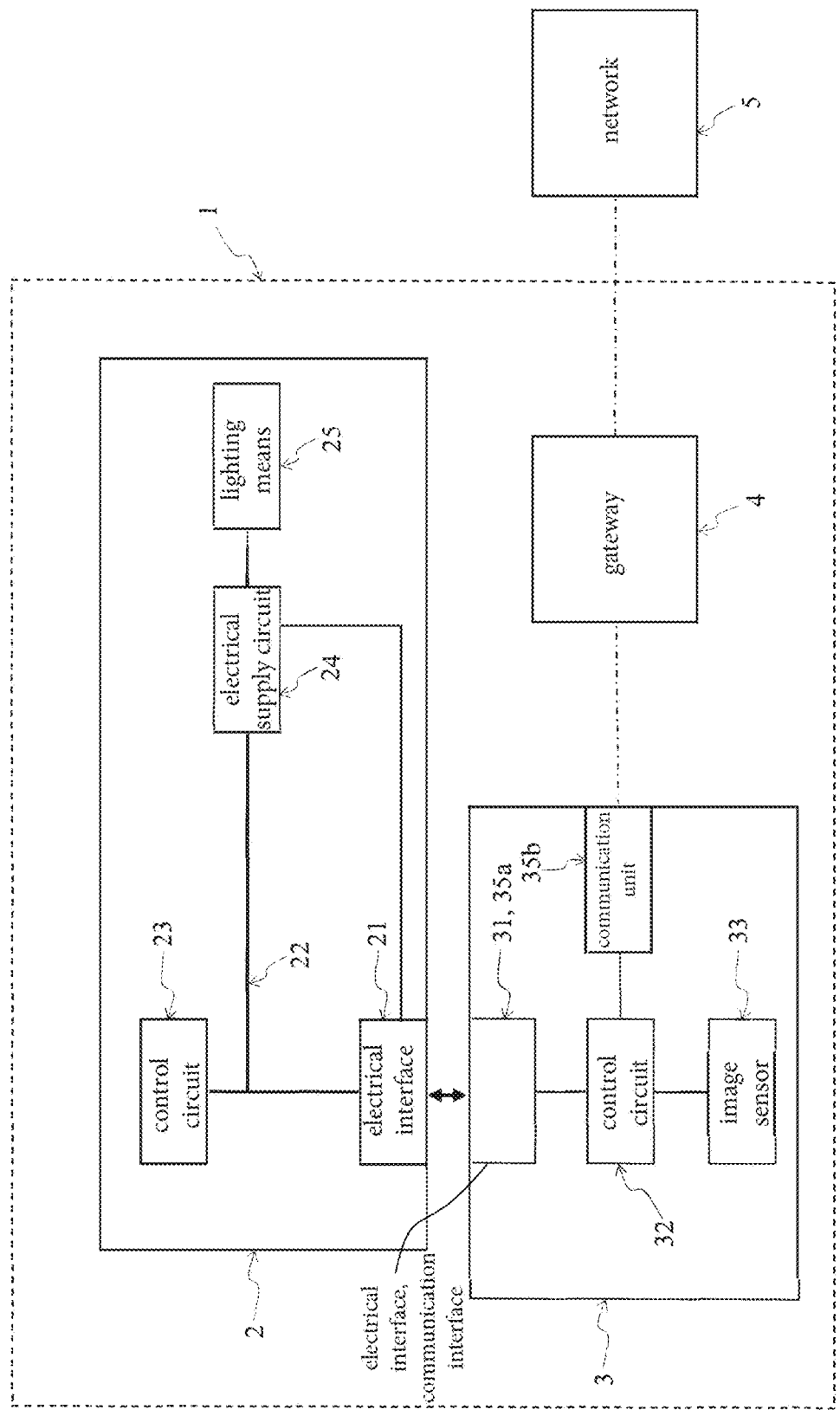
FIG. 5 exemplarily shows a block diagram of a system according to an embodiment of the present invention.

FIG. 5 exemplarily shows a block diagram of a system according to an embodiment of the present invention.

The system of FIG. 5 essentially corresponds to the system of FIG. 3 and, thus, in the following mainly the difference, in particular the additional features shown in FIG. 5 are described. The above description of the system of FIG. 3 is correspondingly valid for the system of FIG. 5.

The communication interface of the camera module 3 may be formed by two or more communication interface parts, wherein a first communication interface part 35a may be part of the mechanical and electrical interface 31 of the camera module 3 and a second communication interface part 35b may be separate of the mechanical and electrical interface 31. For example, the first communication interface part 35a may comprise or correspond to at least one electrical connection element (e.g. electrical connector) or at least one conductor loop, optional at least one coil, of the camera module 3. The first communication interface part 35a of the camera module 3 may be configured to communicate wired (via the at least one electrical connection element) or wirelessly (via an inductive coupling of the at least one conductor loop, optional at least one coil) with the communication interface of the luminaire 2 (being at least partly a part of the interface 21 of the luminaire 2). According to the embodiment of FIG. 5, the communication interface of the luminaire 2 is part of the mechanical and electrical interface 21 of the luminaire 2.

The second communication interface part 35b may comprise or correspond to a communication unit 35b of the camera module 3 that is configured to communication with extern (outside the camera module 3). As indicated in FIG. 5, the communication unit 35b may be configured to wirelessly communicate with extern.

The system 1 may further comprise a gateway 4, wherein the gateway 4 is configured to communicate with a network 5. The network 5 may be a cloud network. As indicated by the stripped line between the communication unit 35b of the camera module 3 and the gateway 4, the communication interface of the camera module 3, in particular the communication unit 35b (being a part of the communication interface of the camera module 35b), may be configured to wirelessly communicate with the gateway 4.

The communication unit 35b of the camera module 3 may be electrically connected to the control circuit 32 of the camera module 3, so that the control circuit 32 may be configured to communicate via the communication unit 35b with extern, e.g. with the gateway 4. Thus, the communication unit 35b may be configured to communicate information that is determined by the control circuit 32 to extern, e.g. to the gateway 4.

Alternatively, the communication interface of the camera module 3 may comprise or correspond to only the communication unit 35b configured to wirelessly communicate with extern (not shown in FIG. 5). In this case, the communication interface of the luminaire 2 may comprise or correspond to only a communication unit configured to wirelessly communicate with extern, wherein the communication unit of the luminaire 2 is electrically connected to the control circuit 23 of the luminaire 2. Thus, the communication interface of the camera module 3, in particular the communication unit 35b, and the communication interface of the luminaire 2, in particular the communication unit of the luminaire 2, may be configured to wirelessly communicate with each other. The communication unit 35b of the camera module 3 may be configured to wirelessly communicate with the gateway 4.

For more information on the system of FIG. 5, in particular on the communication between the communication interface of the camera module 3 with the gateway 4 and the communication between the gateway 4 and the network 5, reference is made to the above description of the system according to the first aspect of the present invention.

Optionally the embodiment of FIG. 4 and the embodiment of FIG. 5 may be combined in that the communication interface of the luminaire 2 may be formed by two or more communication interface parts, wherein a first communication interface part 26a may be part of the mechanical and electrical interface 21 of the luminaire 2 and a second communication interface part 26b may be separate of the mechanical and electrical interface 21 (cf. FIG. 4). In addition, the communication interface of the camera module 3 may be formed by two or more communication interface parts, wherein a first communication interface part 35a may be part of the mechanical and electrical interface 31 of the camera module 3 and a second communication interface part 35b may be separate of the mechanical and electrical interface 31 (cf. FIG. 5).

Figure 6:
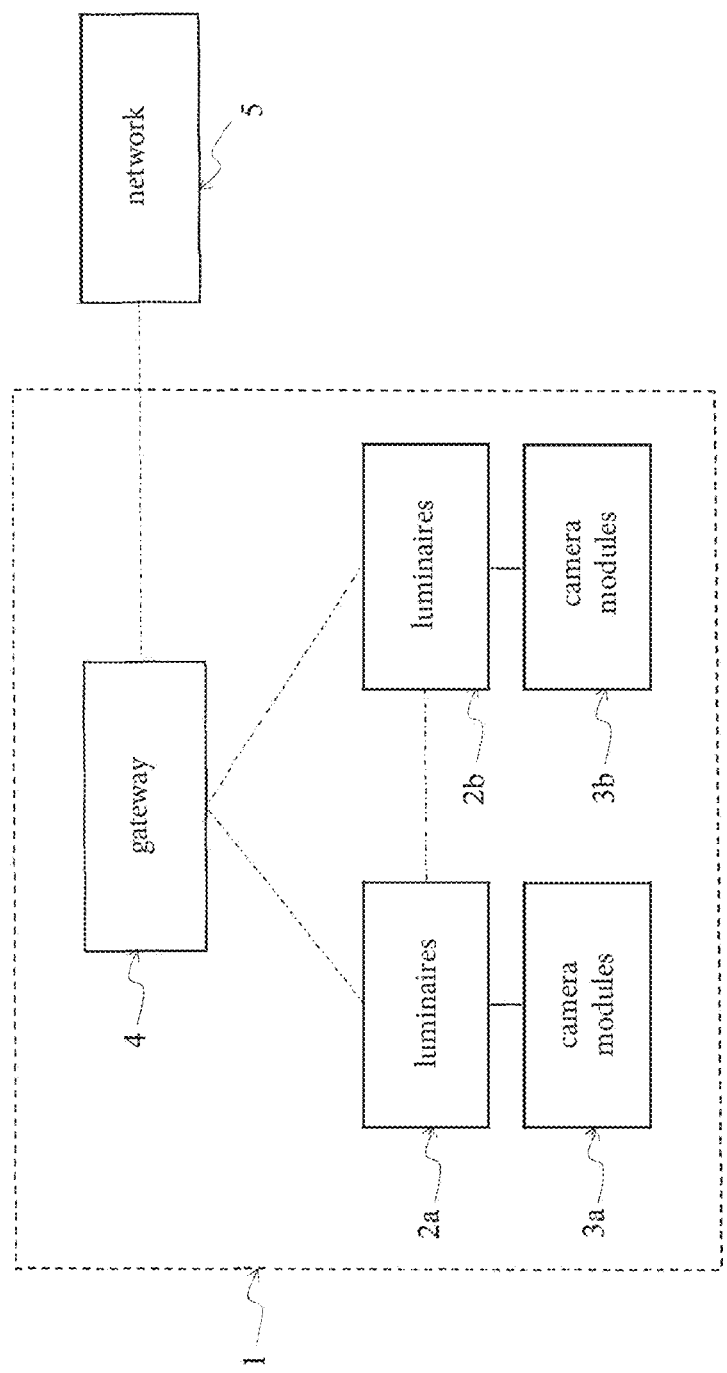
FIG. 6 exemplarily shows a block diagram of a system according to an embodiment of the present invention.

FIG. 6 exemplarily shows a block diagram of a system according to an embodiment of the present invention.

As shown in FIG. 6, the system may comprise two or more luminaires 2a and 2b and two or more camera modules 3a and 3b. The above description of a luminaire of the system according to the first aspect of the present invention and the systems of FIGS. 1 and 3 to 5 is correspondingly valid for each of the at least two luminaires 2a, 2b. That is, each of the at least two luminaires 2a, 2b may be implemented in line with the luminaire of the system according to first aspect of the present invention, as described above. The above description of a camera module of the system according to the first aspect of the present invention and the systems of FIGS. 1 and 3 to 5 as well as the above description of the camera module of FIG. 2 is correspondingly valid for each of the at least two camera modules 3a, 3b. That is, each of the at least two camera modules 3a, 3b may be implemented in line with the camera module of the system according to first aspect of the present invention, as described above.

Each camera module may be configured to be electrically and mechanically connected to a corresponding luminaire That is, as shown in FIG. 6, the camera module 3a may be electrically and mechanically connected to the luminaire 2a and the camera module 3b may be electrically and mechanically connected to the luminaire 2b. The camera module 3a and the corresponding luminaire 2a may be configured to communicate with each other and, thus, the camera module 3a may be configured to provide the corresponding luminaire 2a with information. The information in particular corresponds to information determined by the control circuit of the camera module 3a based on image data provided by the at least one image sensor of the camera module 3a. The same is valid for the camera module 3b and the corresponding luminaire 2b. In addition, the at least two luminaires 2a and 2b may be configured to communicate with each other. The communication between a camera module and the corresponding luminaire may be wired or wireless. The communication between the at least two luminaires 2a, 2b may be wireless.

The system 1 may further comprise a gateway 4, wherein the gateway 4 is configured to communicate with a network 5. The network 5 may be a cloud network. As indicated by the stripped line between each of the at least two luminaires 2a, 2b and the gateway 4, each luminaire of the at least two luminaires 2a, 2b may be configured to wirelessly communicate with the gateway 4.

For further information on the system 1 of FIG. 6 reference is made to the above description of the system according to the first aspect of the present invention.

Figure 7:
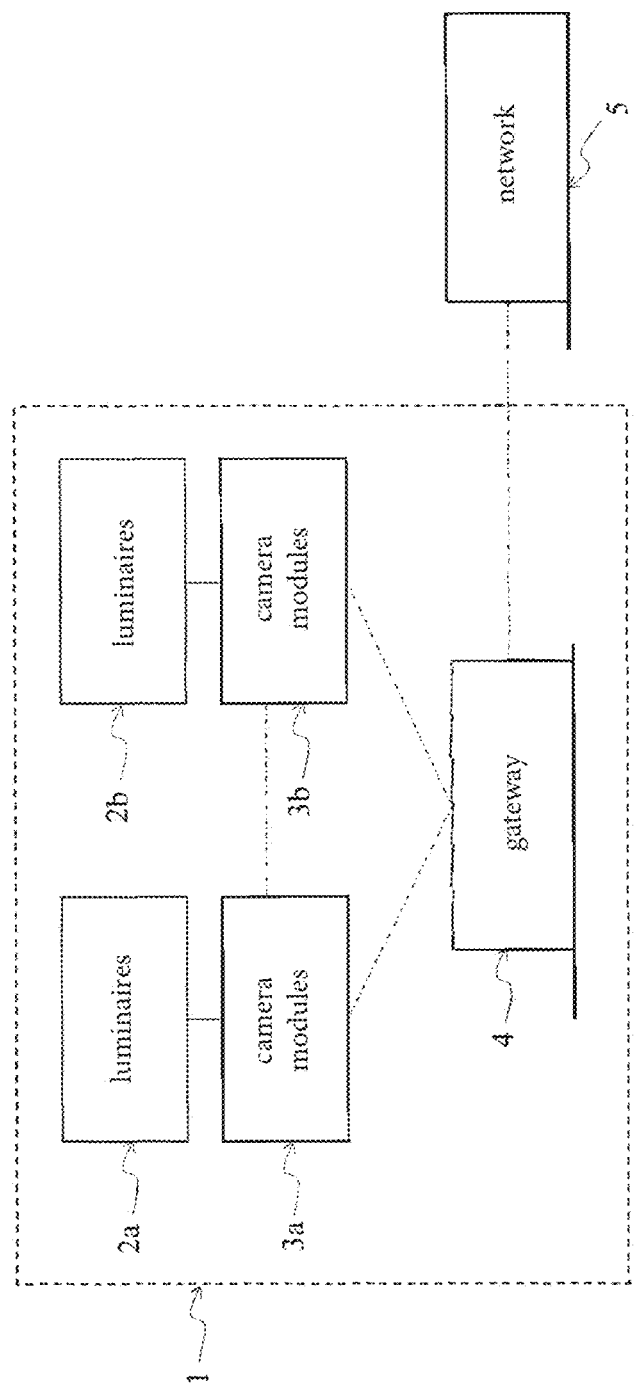
FIG. 7 exemplarily shows a block diagram of a system according to an embodiment of the present invention.

FIG. 7 exemplarily shows a block diagram of a system according to an embodiment of the present invention.

The system of FIG. 7 essentially corresponds to the system of FIG. 6 and, thus, in the following mainly the difference with regard to the system of FIG. 6 is described. The above description of the system of FIG. 6 is correspondingly valid for the system of FIG. 7.

According to FIG. 7, the at least two camera modules 3a and 3b may be configured to communicate with each other. The communication between the at least two camera modules 3a and 3b may be wireless. Optionally, the at least two luminaires 2a, 2b are not configured to communicate with each other.

As indicated by the stripped line between each of the at least two camera modules 3a and 3b and the gateway 4, each camera module of the at least two camera modules 3a and 3b may be configured to wirelessly communicate with the gateway 4. Optionally, the at least two luminaires 2a, 2b are not configured to communicate with the gateway 4.

Optionally the embodiment of FIG. 6 and the embodiment of FIG. 7 may be combined in that the at least two luminaires 2a, 2b may be configured to communicate with each other and the gateway 4 (cf. FIG. 6). In addition, the at least two camera modules 3a, 3b may be configured to communicate with each other and the gateway (cf. FIG. 7).

Any wireless communication mentioned herein may be performed according to any wireless communication method known in the art, for example according to the W-LAN industry standard and/or the Bluetooth industry standard. Optionally any communication unit configured for wireless communication mentioned herein may be a wireless telecommunication unit.

The invention claimed is:

1. A system comprising a luminaire illuminating a parking area and a camera module having a detection field commensurate with the parking area, wherein
    the luminaire and the camera module each comprise an interface for mechanically and electrically connecting the camera module and the luminaire with each other,
    the camera module is configured to be mechanically and electrically connected to the luminaire by mechanically and electrically connecting the interface of the camera module to the interface of the luminaire, and
    the luminaire is configured to electrically supply the camera module with electrical energy via the interface of the luminaire and the interface of the camera module, when the interface of the camera module is electrically and mechanically connected to the interface of the luminaire, wherein
    the camera module comprises a control circuit having data storage storing a trained machine learning model, and at least one image sensor, wherein the trained machine learning model is trained on previously collected data sets,
    the at least one image sensor is configured to detect an image of a parking area within the detection field of the camera module and provide the image in the form of image data to the control circuit exclusively, and
    the control circuit is configured to use the trained machine learning model to extract information on the parking area from the image data, said extracted information comprising a status of one or more parking spots in the parking area, wherein the status may vary between occupied and free,
    further wherein the extracted information is transmitted from the control circuit of the camera module to the luminaire via the interface of the luminaire and the interface of the camera module and said image data is not transmitted from the control circuit and is not stored, and
    the illumination of the luminaire is controlled by the transmitted extracted information in accordance with the status of the parking spots in the parking area, such that the illumination color of free spots is different from the illumination color of occupied spots.

2. The system according to claim 1, wherein
    a housing of the luminaire comprises the interface of the luminaire for mechanically and electrically connecting the camera module to the housing of the luminaire.

3. The system according to claim 1, wherein
    the interface of the luminaire is arranged at the housing of the luminaire, and the interface of the camera module is arranged at the camera module such that the at least one image sensor of the camera module is configured to detect an image of an area that is illuminable by the luminaire, when the interface of the camera module is electrically and mechanically connected to the interface of the luminaire.

4. The system according to claim 1, wherein
    the camera module comprises a communication interface configured to communicate with extern.

5. The system according to claim 4, wherein
    the luminaire comprises a communication interface configured to communicate with extern, and
    the communication interface of the luminaire and the communication interface of the camera module are configured to communicate with each other.

6. The system according to claim 5, wherein
    the communication interface of the luminaire and the communication interface of the camera module are configured to wirelessly communicate with each other, and/or
    the communication interface of the luminaire is part of the interface of the luminaire and the communication interface of the camera module is part of the interface of the camera module so that the communication interface of the luminaire and the communication interface of the camera module are configured to communicate with each other, when the interface of the camera module is electrically and mechanically connected to the interface of the luminaire.

7. The system according to claim 5, wherein
    the control circuit of the camera module is configured to transmit, via the communication interface of the camera module, the extracted information on the area to the communication interface of the luminaire, and the communication interface of the luminaire is configured to provide the extracted information on the area, received from the communication interface of the camera module, to a control circuit of the luminaire for controlling illumination of the luminaire.

8. The system according to claim 5, wherein
the luminaire comprises a wired bus electrically connected to
a control circuit of the luminaire for controlling illumination of the luminaire, and
the communication interface of the luminaire; and
the communication interface of the camera module is configured to communicate with the control circuit of the luminaire via the communication interface and the wired bus of the luminaire.

9. The system according to claim 8, wherein
the control circuit of the camera module is configured to transmit via the communication interface of the camera module to the communication interface of the luminaire one or more bus signals for controlling the illumination by the luminaire based on the extracted information on the area.

10. The system according to claim 4, wherein
the system comprises a gateway for communicating with a network, optionally a cloud network, and
the communication interface of the luminaire is configured to wirelessly communicate with the gateway and/or the communication interface of the camera module is configured to wirelessly communicate with the gateway.

11. The system according to claim 10, wherein
the communication interface of the luminaire is configured to wirelessly transmit data, including the extracted information on the area, received from the communication interface of the camera module to the gateway, and/or
the communication interface of the camera module is configured to wirelessly transmit data, including the extracted information on the area, to the gateway.

12. The system according to claim 1, wherein
the system comprises two or more of the luminaire, and
the camera module is configured to be electrically and mechanically connected to one of the two or more of the luminaire.

13. The system according to claim 12, wherein
the system comprises two or more of the camera module, and
each of the two or more of the camera module is configured to be electrically and mechanically connected to a respective one of the two or more of the luminaire.

14. The system according to claim 13, wherein
the two or more of the camera module are configured to wirelessly communicate with each other.

15. The system according to claim 1 wherein the luminaire is an outdoor luminaire.

16. The system according to claim 1 wherein the luminaire comprises a wired bus that is a DALI bus or DALI-2 bus.

17. The system according to claim 1 wherein:
the interface on the luminaire includes a luminaire conductor loop and the interface on the camera module includes a module conductor loop;
the camera module is configured to be mechanically connected to the luminaire such that the module conductor loop aligns with the luminaire conductor loop and the module conductor loop and the luminaire conductor loop are inductively coupled;
the luminaire is configured to electrically supply the camera module with electrical energy via said inductive coupling of the luminaire conductor loop and the module conductor loop, when the interface of the camera module is mechanically connected to the interface of the luminaire;
wherein data is able to be wirelessly transmitted from the camera module to the luminaire via said inductive coupling; and
further wherein the extracted information is transmitted from the control circuit of the camera module to the luminaire via said inductive coupling.

18. The system according to claim 1 wherein the luminaire comprises a wired bus that is a DALI bus or DALI-2 bus.

* * * * *